United States Patent [19]

Winsett

[11] 4,242,768
[45] Jan. 6, 1981

[54] MEANS FOR ATTACHING A BOAT TO A TRAILER

[75] Inventor: Walter P. Winsett, Houston, Tex.

[73] Assignee: Darrell T. Mosley, Houston, Tex.

[21] Appl. No.: 54,166

[22] Filed: Jul. 2, 1979

[51] Int. Cl.³ ............................................... B63P 3/10
[52] U.S. Cl. ................................... 9/1.2; 280/414 R; 403/328
[58] Field of Search ................... 280/414 R, 477, 508, 280/507, 486; 9/1.2; 114/252, 249, 250; 403/328, 322, 325, 324

[56] References Cited

U.S. PATENT DOCUMENTS

| 2,150,010 | 3/1939 | Solomon | 280/477 |
|---|---|---|---|
| 2,691,145 | 10/1954 | Watts | 403/328 X |
| 3,091,352 | 5/1963 | Vitable | 280/477 X |
| 3,755,834 | 9/1973 | Rice | 9/1.2 |
| 3,989,266 | 11/1976 | Foster | 280/414 R |
| 4,082,311 | 4/1978 | Hamman | 280/507 |
| 4,178,011 | 12/1979 | Kirsch | 280/477 |

*Primary Examiner*—John A. Pekar
*Attorney, Agent, or Firm*—Walker & McKenzie

[57] ABSTRACT

A device for attaching a boat to a trailer including two cones. The first is a male cone attached to the bow of a boat. The second is a female cone attached to a boat trailer. When the two devices are joined together the point of the male cone enters the female cone at the open end. The male cone has four locking devices corresponding with four grooved areas on the female cone for locking the two cones together to thereby lock the boat to the trailer.

2 Claims, 10 Drawing Figures

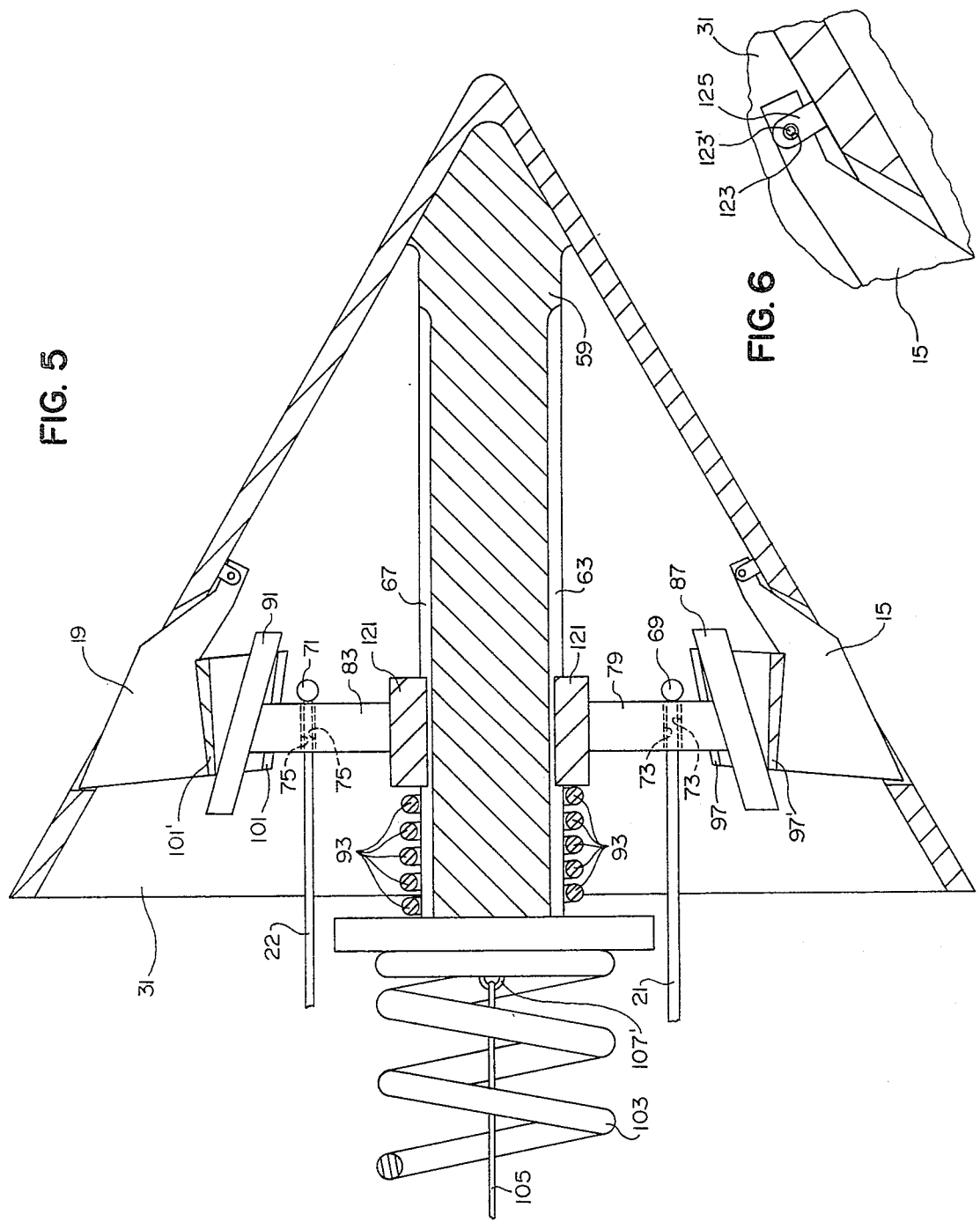

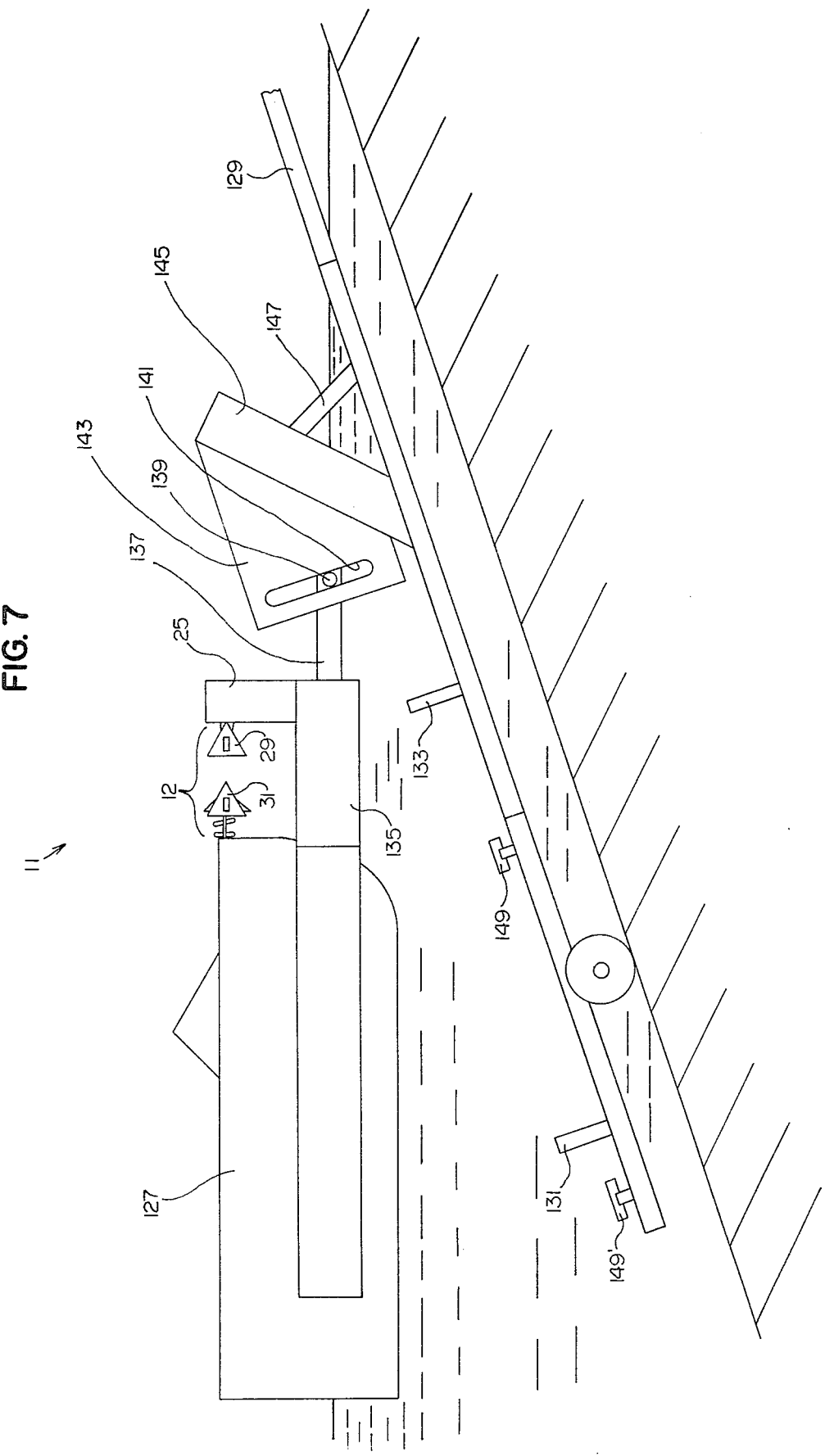

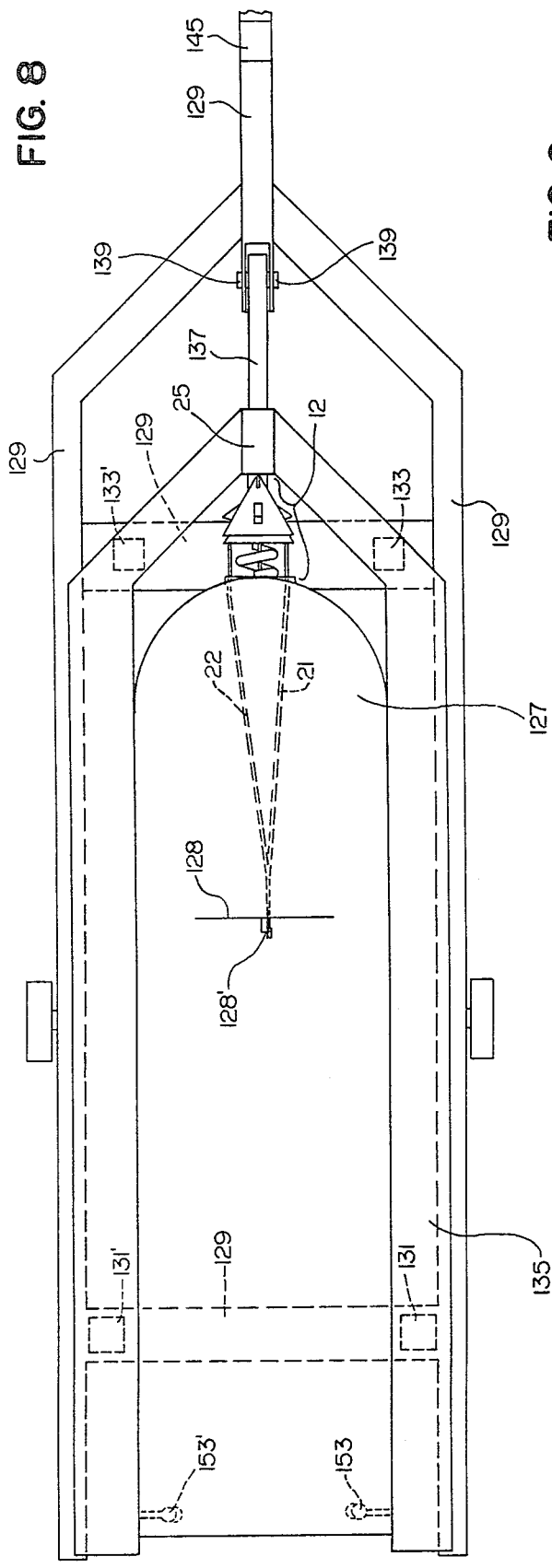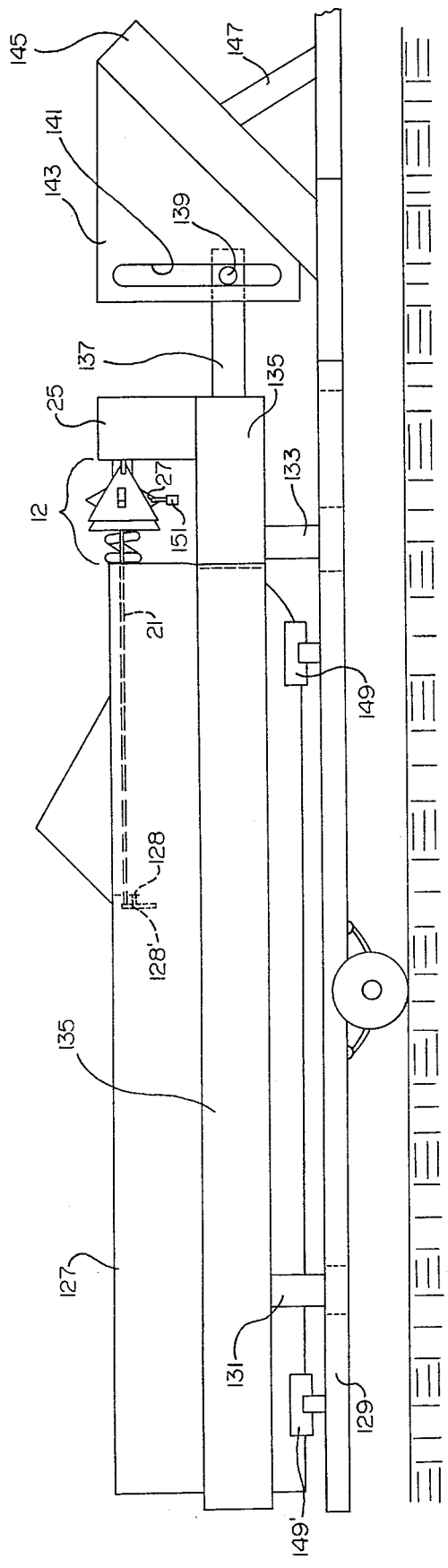

MEANS FOR ATTACHING A BOAT TO A TRAILER

BACKGROUND OF THE INVENTION

1. Field of the Invention

This invention relates to a means for attaching a boat to a trailer.

2. Description of the Prior Art

Heretofore, various means have been used for attaching a boat to a trailer. For example, in Rice, U.S. Pat. No. 3,720,967, a rope attachment has been applied to a boat trailer combination. In Moore, U.S. Pat. No. 3,004,771, a fastening means has been applied to a boat trailer combination consisting of four upwardly extending struts 30, 31, 32 and 33, each having a means 30', 31', 32', and 33' respectively for removably attaching the struts to the end of the boat. These attaching means may be U-shaped as shown in 30' and 32' or merely flattened perforated ends as 31' and 33'. When the boat is in position on the trailer, a pin or bolt may be slipped through the openings at the ends of 30', 31', 32' and 33' and corresponding mating means on the hull of the boat. However, both of these devices are disadvantageous because an additional manual step is required to attach the boats to the trailer.

The following U.S. patents relate to boats and trailers or launching devices: Park, U.S. Pat. No. 3,608,754; Pannell, U.S. Pat. No. 3,744,072; Gudmundson, U.S. Pat. No. 3,365,733. None of the above patents suggest or disclose applicant's device.

SUMMARY OF THE INVENTION

The present invention is directed toward overcoming the problems and disadvantages of prior means for attaching a boat to a trailer. The concept of the present invention is to attach a boat to a trailer by the use of a system comprised of a male and a female member, such as two cones or the like. The first member is a male cone or the like which has a lock means that may be attached to the bow of the boat. The second member is a female cone or the like including a lock means for coacting with the lock means in the male cone. When the two devices meet they latch together in four places and hold the boat firmly in place. The female means includes a body member having a lock means and a cam means. The male means includes a body member having a cam follower means for coacting with the cam means of the female means to guide the lock means of the male means into a lockable engagement with the lock means of the female means.

BRIEF DESCRIPTION OF THE DRAWINGS

FIG. 5 is a sectional view of the male means substantially as in FIG. 3 but in an unlocked position of the present invention.

FIG. 6 is an enlarged sectional view of the present invention as taken from FIG. 5 or FIG. 3.

FIG. 7 is a right side elevational view of the means for attaching a boat to a trailer during loading or unloading of the present invention.

FIG. 8 is a top plan view of the means for attaching a boat to a trailer of the present invention.

FIG. 9 is a right side elevational view of the means for attaching a boat to a trailer in the trailering position of the present invention.

DESCRIPTION OF THE PREFERRED EMBODIMENT

Figure 1:
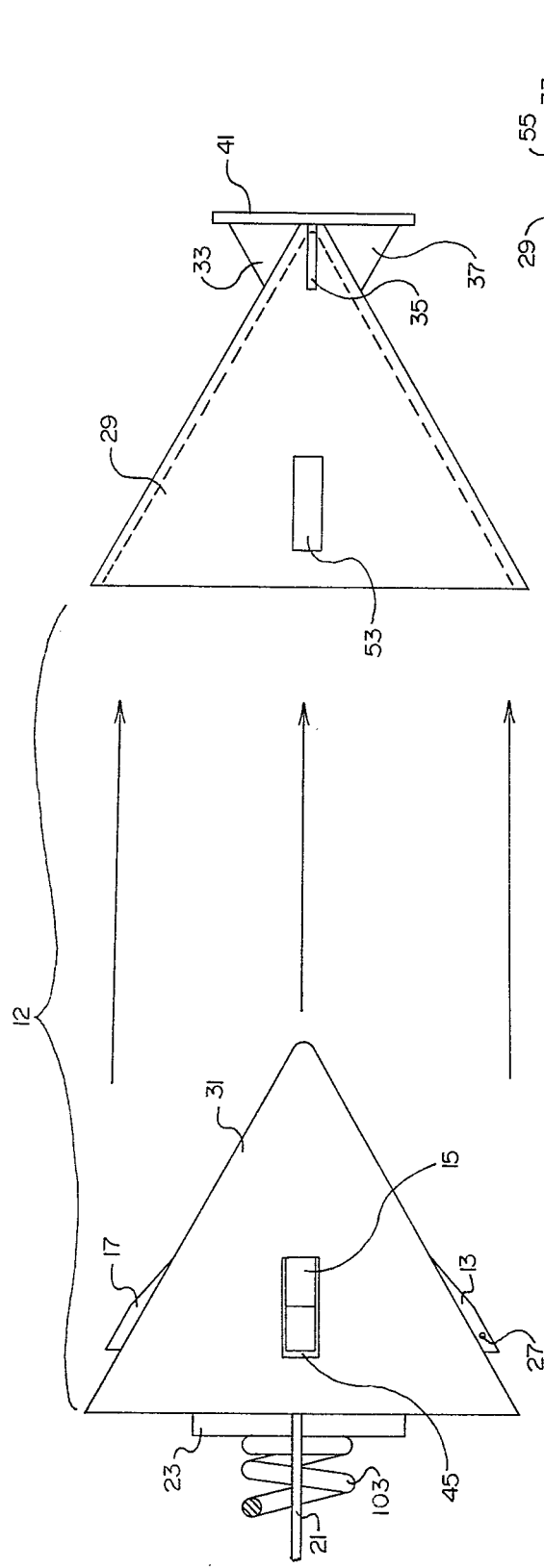
FIG. 1 is a right side elevational view of the male and female means devices of the present invention.
Figure 2:
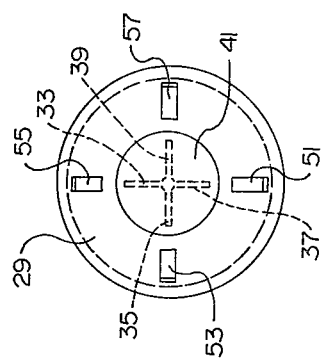
FIG. 2 is a front elevational view on a reduced scale of the male and female means of the present invention.

The means 11 of the present invention for attaching a boat 127 to a trailer 129 includes lock means 12 (see FIGS. 1, 2, 7, 8, 9 and 10) for connecting the boat 127 and trailer 129 together in a locking manner or disengaging the same boat 127 and trailer 129 in a similar manner. Means 11 includes a flotation collar 135 pivotable from a forward point on pivot pin 139. Also included is a means of supporting the flotation collar from the trailer i.e., through the use of flotation supports 131, 131', 133 and 133'. This also includes a means of aligning boat 127 and trailer 129 using boat guide means 153, 153' in conjunction with the lock means 12 to align boat 127 for fit on trailer 129. From FIGS. 1, 2, 3, 7, 8 and 9 it will be seen that the lock means 12 includes two parts: a female means 29 and a male means 31.

Female means 29 has lock means or void areas such as 51, 53, 55 and 57 and a body member 30 having a substantially conical cavity including a conically shaped cam means 30' defined by the interior surface of body member 30 capable of receiving male means 31. The male means 31 includes a body member 34 having a conically shaped cam follower means 34' defined by the exterior surface of body member 34 for coacting with the cam means 30' of the female means 29 to guide lock means 12 into automatic locking engagement. Male means 31 includes latch members which are preferably a plurality such as shown at 13, 15, 17 and 19 for protruding respectively through void areas 43, 45, 47 and 49 in the male body member 31. Void areas 43, 45, 47 and 49 are substantially aligned with void areas 51, 53, 55 and 57 in female means 29. When the male means 31 comes in contact with the female means 29 the latch members 13, 15, 17 and 19 come into a lockable engagement with voids 51, 53, 55 and 57 in female means 29. The body member 34 of the female means 29 is attached to the trailer 129 while the body member 30 of the male means 31 is attached to the boat 127.

Figure 3:
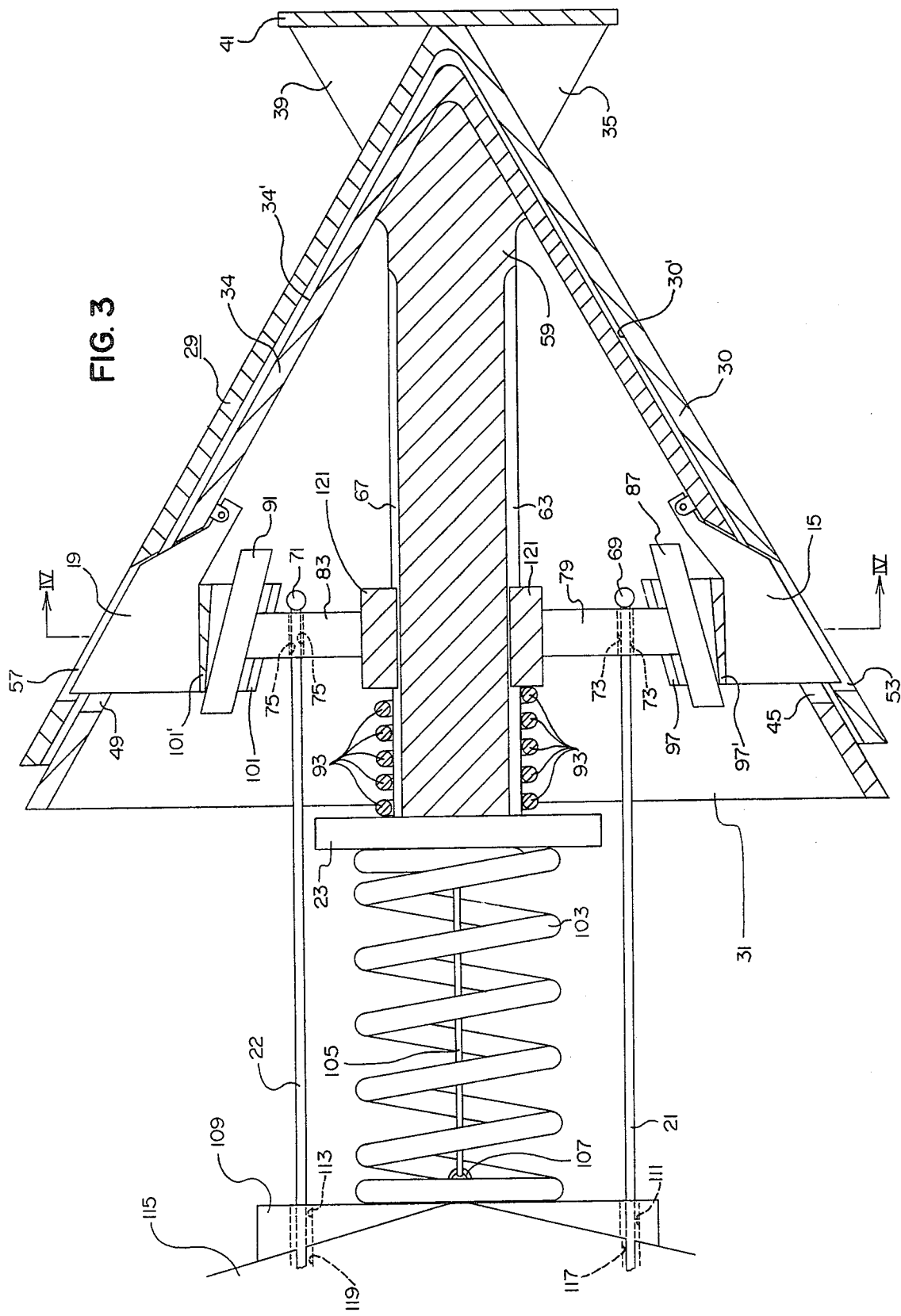
FIG. 3 is a sectional view of the male and female means in a latched together position of the present invention as taken from line III—III of FIG. 4.
Figure 4:
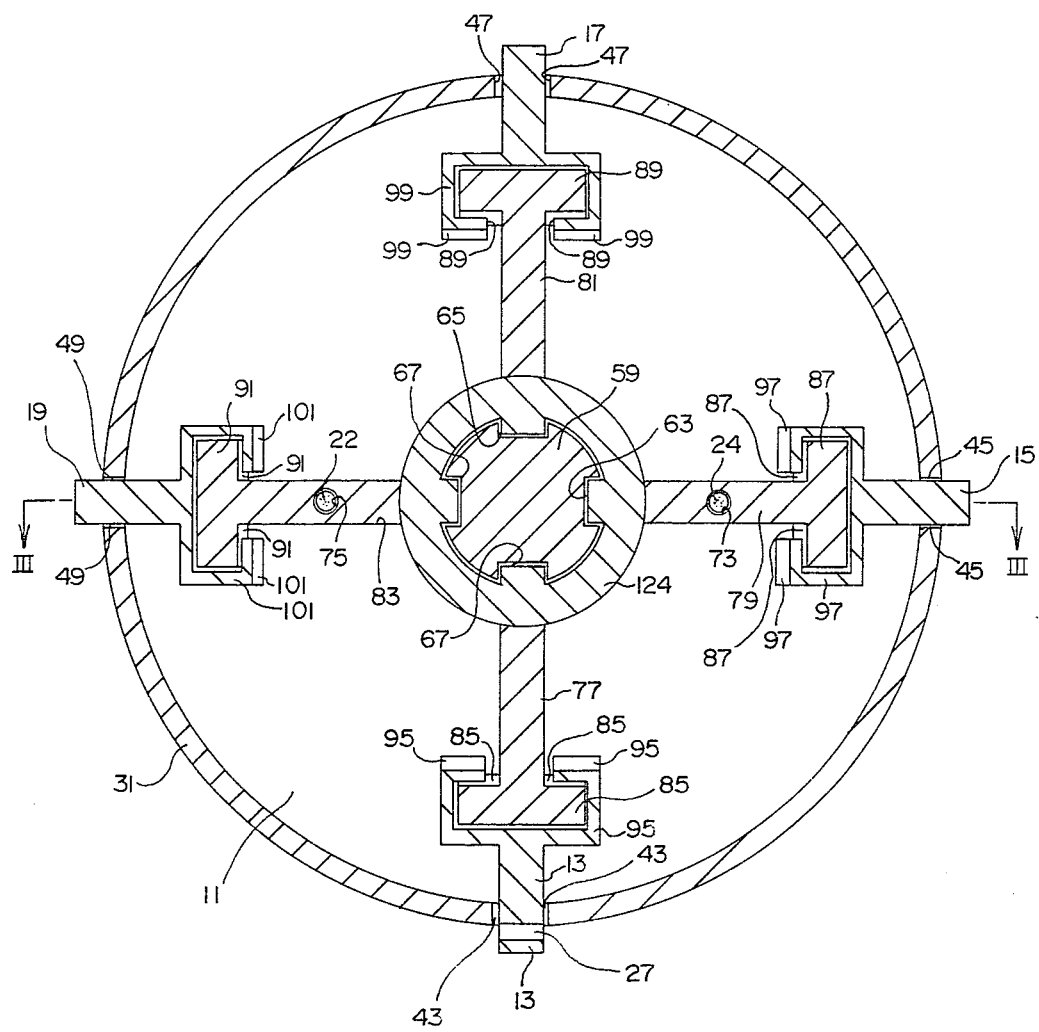
FIG. 4 is a sectional view of the rear of the male means of the present invention as taken on line IV—IV of FIG. 3.
Figure 10:
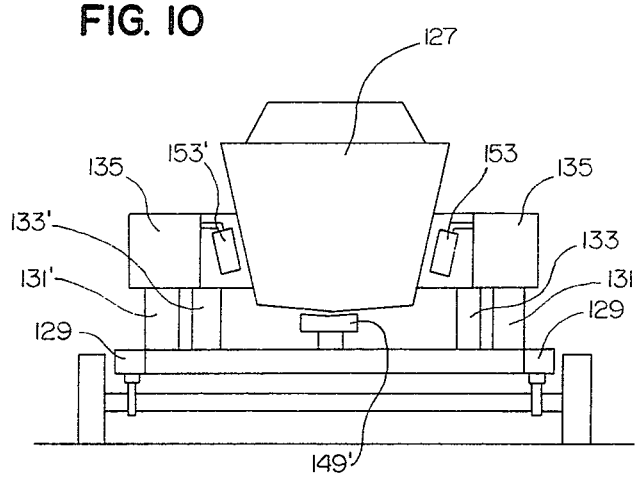
FIG. 10 is a rear elevational view of the means for attaching a boat to a trailer of the present invention.

A means for urging latch members 13, 15, 17 and 19 outwardly of the male means 31 as shown in FIGS. 3, 4, 5 and 6 includes a shaft 59 centrally located in male means 31. Shaft 59 is fixedly attached, as by welding or the like, at its forward end to body member 34 on the inside of the nose of the conically shaped body member 34 and extends rearwardly therefrom. Shaft 59 is provided with four elongated slots 61, 63, 65 and 67 upon which a collar 121 rides horizontally. The collar 121 has a capacity for moving forwardly or reversely on the shaft 59. Fixedly attached and extending radially outwardly in preferably four different directions from the collar 121 are four connecting members 77, 79, 81 and 83; mounted on each extremity of a connecting member is an angularly disposed foot 85, 87, 89 and 91. Mounted inside the male means 31 are eight lugs 125, two of which are mounted directly adjacent each void area 43, 45, 47 and 49. Both are at the end of the void areas closest to the nose or point of the conical shaped male means 31. Both are parallel with a hole 123 in each to accommodate a pin 123' which passes through the end of each of the latch members 13, 15, 17 or 19 to pivotally attach the latch members to body member 34. Fixedly attached to the latch members 13, 15, 17 and 19 inside the male means 31 are foot engaging members 95, 97, 99 and 101, which are wrapped around the sides of the foot members 85, 87, 89 and 91 and connecting members 77, 79, 81 and 83 when the female means 29 and the male means 31 are in engagement as shown in FIGS. 3 and 4. The foot members 85, 87, 89 and 91 have a constant forward pressure exerted upon them by tension spring 93 which in turn causes an outward pressure on foot engaging members 95, 97, 99, 101 causing latch members 13, 15, 17 and 19 to pivot outward on pins 123'. This action causes the rear surface of latch members 13, 15, 17 and 19 to engage with the rear surface of the female lock means 51, 53, 55 and 57, thereby creating a locking engagement. There is also a means of padlocking the lock means 12 by use of a hole 27 in latch member 13.

In FIGS. 3, 5 and 4, a means for disengaging the lock means 12 is shown which includes two release cables 21 and 22 on the right and left sides of male means 31 which extend through holes 73 and 75 in foot connecting members 79 and 83. On the inside of the male means 31 each release cable 21 and 22 has a ball 69 and 71 connected to the corresponding release cables 21 and 22 which is too large to pass through the holes 73 or 75, thereby connecting the release cables 21 and 22 to corresponding foot connecting members 79 and 83. Release cables 21 and 22 then run back through holes 111 and 113 in boat mounting bracket 109 mounted on hull 115 of boat 127 and through corresponding holes 117 and 119 in hull 115 to boat 127 dash area 128 to some suitable type of a remote control device such as a release handle 128' for selectively pulling said latch members inward into the voids 43, 45, 47 and 49 of the male means 31 to unlock male means 31 and the female means 29 from a lockable engagement.

The boat mounting bracket 109 has one end of an alignment spring 103 mounted in a manner known to someone skilled in the art. The other end is mounted in a like manner to the flat side of spring stop 23 fixedly attached to the end of shaft 59. Tension spring 93 is mounted around shaft 59, between collar 121 and spring stop 23. Also attached to the boat mounting bracket 109 is a ring 107 with one end of a tension cable 105 attached thereto, in a manner known to a person skilled in the art. The opposite end of tension cable 105 is attached in a like manner to another ring 107' which in turn is attached to spring stop 23. The combination of the two rings 107, 107' and the tension cable 105 are used for the purpose of supporting alignment spring 103 and of preventing the alignment spring 103 from stretching beyond a certain amount in the act of loading or unloading the boat 127. The alignment spring 103 also allows for adjustment in depth of boat 127 for minor course correction in loading of boat 127.

From FIGS. 3, 7, 8. 9 and 10 it will be seen that the combination of center shaft 59, spring stop 23, two rings 107 and 107', the tension cable 105 and a boat mounting bracket 109 complete a system whereby the male means 31 is attached to the boat 127.

The point of the female means 29 has four triangular shaped support members 33, 35, 37 and 39 welded or otherwise attached to the female means 29. the female means support members 33, 35, 37 and 39 are further attached to an attachment plate 41, by suitable means as by welding, which is further attached to a mounting post 25, by suitable means as by welding, which in turn is mounted atop the center of the U-shaped flotation collar 124. The flotation collar 124 is used in conjunction with rollers 153 and 153' which act as a guide for alignment of the male means 31 and the female means 29. From FIGS. 7, 8 and 9 it will be seen that out of the front center of the flotation collar 135 extends an attachment member 137 to a pivot pin bracket 143 having a bifucated portion provided with elongated slots 141 on each side of attachment member 137. A pivot pin 139 extends out from each side of attachment member 137 into the elongated slots 141 allowing the flotation collar 135 to move up, down and pivot pin 139. Bracket 143 is fixedly attached to trailer 129 by suitable supporting structure, such as support member 145 and brace 147. Trailer 129 is provided with four flotation collar support posts 131, 131', 133 and 133' that are intended to catch and support collar 135 when the boat 127 is pulled out of the water while boat supports, such as 149 and 149' catch and support the boat at rest.

A possible method of preventing unwarranted removal of the male means 31 from the female means 29 is a padlock 151 placed in a hole 27 through latch member 13 or any other latch member on the male means.

Although the invention has been described and illustrated with respect to the preferred embodiment thereof it is to be understood that it is not to be so limited since changes and modifications may be made therein which are within the full intended scope of the invention.

I claim:

1. An improvement for use in combination with a boat and a trailer for supporting said boat, wherein the improvement comprises: a female means for being attached to said trailer and a male means for being attached to said boat, said female means including a body member having a lock means and having a cam means, said male means including a body member and including a lock means for coacting with said lock means of said female means to automatically lock said male and female means together when said lock means of said male and female means engage one another thereby locking said boat and said trailer together, said body member of said male means including a cam follower means for coacting with said cam means of said female means to guide said lock means of said male means into lockable engagement with said lock means of said female means, said body member of said female means having a substantially conical cavity for defining said cam means thereof, said body member of said male means having a substantially conical exterior surface for being selectively received in said conical cavity of said female means and for defining said cam follower means thereof, said male means including a spring member having a first end fixedly attached to said body member of said male means and having a second end fixedly attached to said boat for movably attaching said body member of said male means to said boat.

2. A boat and trailer combination comprising:
(a) a generally upstanding member fixedly attached to substantially the forward end of said trailer, said upstanding member having a generally upwardly directed elongated slot therein;
(b) a substantially U-shaped float member for substantially encircling the front and sides of said boat when said boat is positioned above said trailer;

(c) means for pivotally attaching said float member to said upstanding member to allow said float member to pivot relative to said trailer and to move up and down within said slot in said upstanding member to aid in guiding said boat from and onto said trailer;

(d) female means fixedly attached to the forward end of said float member, said female means including a body member having a rearwardly directed substantially conical cavity for defining a cam means and having a plurality of apertures in the side of said conical cavity for defining a lock means; and (e) male means attached to the forward end of said boat, said male means including a body member and a lock means for coacting with said lock means of said female means to automatically lock said male and female means together when said lock means of said male and female means engage one another thereby locking said boat to said trailer, said lock means of said male means including a latch member for extending outward of the exterior surface of said body member of said male means and into each of said apertures of said body member of said female means when said male means is received in said female means, said body member of said male means including a cam follower means for coacting with said cam means of said female means to guide said lock means of said male means into lockable engagement with said lock means of said female means, said body member of said male means including a forwardly directed substantially conical exterior surface for being selectively received in said conical cavity of said female means and for defining said cam follower means thereof, said lock means of said male means including means for urging said latch members thereof outward of said conical exterior surface of said body member of said male means and including means for selectively pulling said latch members thereof inward of said apertures in the side of said conical cavity of said body member of said female means to selectively unlock said male means from said female means, said male means including a spring member having a first end fixedly attached to said body member of said male means and having a second end fixedly attached to the forward end of said boat for movably attaching said body member of said male to said boat, said float member causing said female means to align with said male means when said boat is positioned within said float member.

* * * * *